March 6, 1973  D. E. UEHLING ET AL  3,719,324
VELOCITY SENSOR FEEDBACK MECHANISM FOR
THRUST REVERSER ACTUATING SYSTEM
Filed June 4, 1971
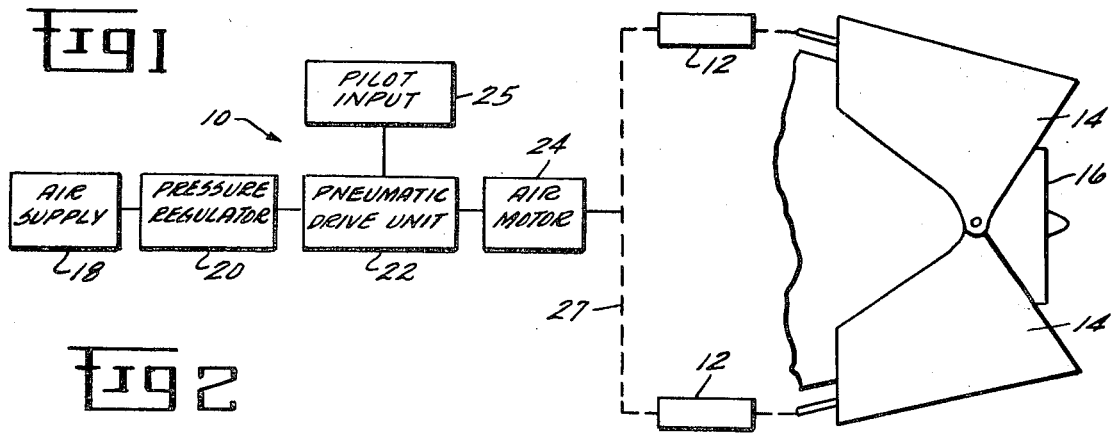
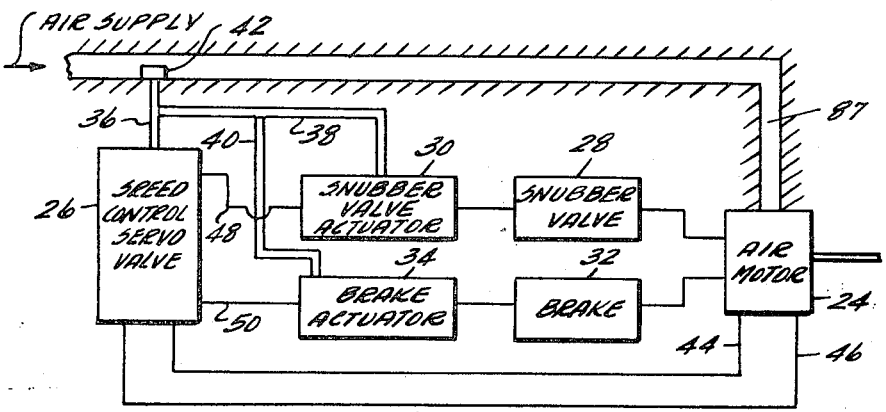
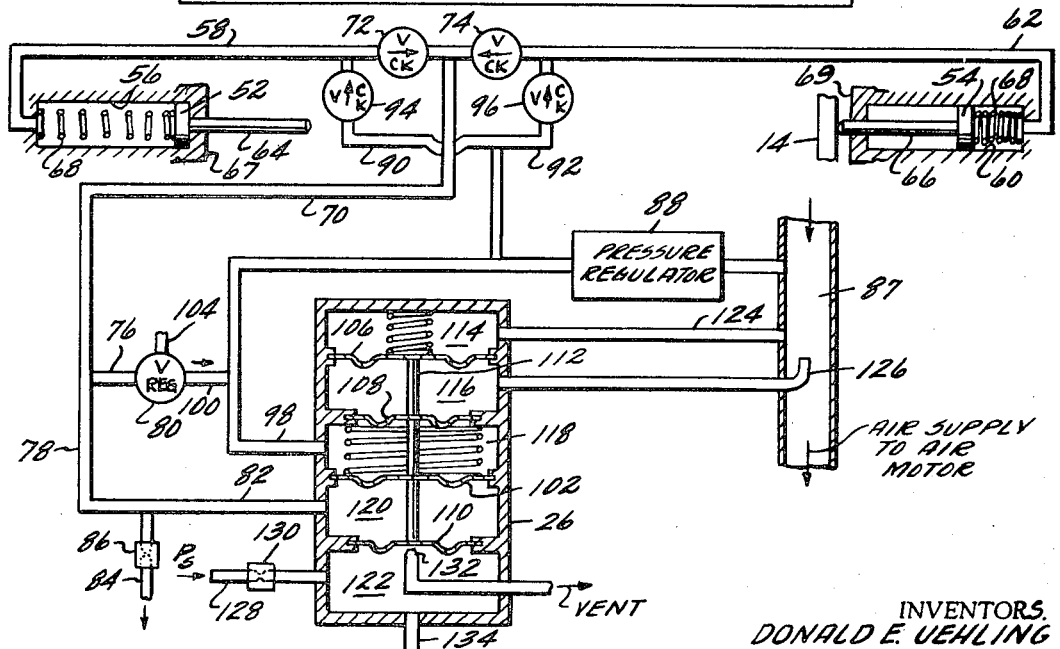
INVENTORS.
DONALD E. UEHLING
STEPHEN B. TUCKER
BY
T. J. Bird, Jr.
AGENT United States Patent Office 3,719,324
Patented Mar. 6, 1973

3,719,324
VELOCITY SENSOR FEEDBACK MECHANISM FOR THRUST REVERSER ACTUATING SYSTEM
Donald E. Uehling and Stephen B. Tucker, Cincinnati, Ohio, assignors to General Electric Company
Filed June 4, 1971, Ser. No. 150,089
Int. Cl. F02k 1/18
U.S. Cl. 239—265.19       8 Claims

ABSTRACT OF THE DISCLOSURE

A control system for stowing and deploying a movable load member, such as a gas turbine engine thrust reverser door, is described as including a velocity sensor feedback loop which both protects the load member and assures complete deployment thereof. The velocity sensor comprises a piston and chamber positioned so that the piston comes into contact with the load member as it nears an extreme position of movement. As the piston is engaged, a pressure builds up in the chamber which is a function of the velocity of the load member. This pressure forms an input to a servomechanism which controls the velocity of the load member. The system is provided with means for venting the piston chamber as the load member comes to rest to assure that the load member is maintained in its final position by the servomechanism.

BACKGROUND OF THE INVENTION

This invention relates generally to thrust reverser systems for gas turbine engines and, more particularly, to a control system for a thrust reverser which includes a passive velocity sensor to assist in proper stowage and deployment of the thrust reverser.

In aircraft gas turbine engines it is often necessary or desirable to provide means for reversing or at least spoiling the forward propulsive thrust normally produced by the flow of exhaust gases therefrom during aircraft landing. Of primary concern in the design of apparatus for reversing or spoiling such thrust are considerations such as reduced weight and size; minimum aerodynamic drag when such means are stowed or not in use; high reliability and efficiency of operation; and the ease and economy with which such apparatus may be produced and operated.

This invention is concerned primarily with a novel control system for actuating such thrust reversing or spoiling apparatus. A requirement of any thrust reverser/spoiler system is that the reverser apparatus be able to move from the stowed position to the deployed position (and vice versa) in a very short time. This requirement is combined with a further requirement that the apparatus must be decelerated quickly as it comes into its extreme positions so that neither the thrust reverser mechanism nor associated aircraft components are damaged.

An added requirement in any thrust reverser control system is that when the reverser mechanism reaches its extreme positions the apparatus must drive against stops with a controlled torque load imparted thereto in order to prevent the apparatus from vibrating against the stops and causing damage thereto.

SUMMARY OF THE INVENTION

It is an object of the present invention therefore to provide a novel control system which will quickly deploy a thrust reverser mechanism and will control the velocity of the reverser mechanism as it comes to a stop while imparting full torque thereto after it reaches its stop to prevent thrust reverser chattering.

Briefly stated, the above object is attained by providing a control system which includes a pneumatic velocity sensor which is engaged during the last portion of the thrust reverser travel. A signal generated by the sensor is fed back to control the speed of the motor driving the thrust reverser apparatus. In one embodiment, the sensor includes a piston which generates a pressure which is a function of the velocity of the thrust reverser apparatus. The piston is provided with means for bleeding off the pressure when the motion of the thrust reverser apparatus stops, thus assuring that the motor drives the reverser against its stops with full torque.

DESCRIPTION OF THE DRAWINGS

While the specificaiton concludes with a series of claims which particularly point out and distinctly claim the subject matter which applicants regard as their invention, a clear understanding of the invention may be gained from the following detailed description of a preferred embodiment, which is given in light of the accompanying drawing, in which:

FIG. 1 is a schematic diagram of a typical control system for an aircraft gas turbine engine thrust reverser/spoiler mechanism;

FIG. 2 is a schematic diagram, showing in greater detail, portions of the control system shown in FIG. 1; and FIG. 3 is a schematic diagram of a control system incorporating the novel velocity sensor described herein.

DESCRIPTION OF A PREFERRED EMBODIMENT

Referring now to the drawings wherein like numerals correspond to like elements throughout, attention is initially directed to FIG. 1 wherein a typical control system 10 can control one or more actuators 12 which position a pair of thrust reverser blocker doors 14. The blocker doors 14 are movable from a stowed position, as shown, to a deployed position wherein they block the normal exit path for exhaust gases emanating from an exhaust nozzle 16 of a typical gas turbine engine (not shown).

While the description of the present invention will be given in connection with the schematic diagrams of FIGS. 1 and 2, it will become readily apparent from the following that the present invention is applicable to any type of thrust reverser/spoiler mechanism and any type of reverser/spoiler control system. The present description is therefore meant to be merely illustrative of the types of systems to which the present invention could be applied.

Referring still to FIG. 1, the control system 10 includes an air supply 18, which may be, for example, bleed air from the gas turbine engine, a pressure regulator 20, a pneumatic drive unit 22, and an air motor 24.

In operation, pilot demand to the pneumatic drive unit 22, as shown schematically by the numeral 25, operates the air motor 24 to provide a high speed rotary drive to the actuator 12. The high speed rotary drive from the air motor 24 is transferred to the actuators 12 by means of a mechanical connection, shown schematically at 27, which may consist of flexible shafts, gear boxes, etc. The pressure regulator 20 functions to limit the maximum pressure delivered to the air motor 24 and further to prevent bleed leakage from the thrust reverser/spoiler system during cruise operation of the engine.

Referring now to FIG. 2, the pneumatic drive unit 22 which controls the output of the air motor 24 is shown to include a speed control servo valve 26, a snubber valve 28, a snubber valve actuator 30, a brake 32 and a brake actuator 34. The snubber valve 28 and the brake 32 function to control the output of the air motor 24 in a well-known manner. That is, the snubber valve 28 controls the amount of flow exhausting from the air motor 24; while the brake 32 directly engages rotating components of the motor 24. Air is supplied to the speed control servo valve 26 and to the snubber valve actuator 30 and the brake actuator 34 from the air supply 18 through lines 36, 38, and 40, respectively. In most cases, this air would first pass through a suitable filter 42.

Inputs to the speed control servo valve consist of the speed and pressure of the air motor 24. For this reason, feedback lines, shown schematically at 44 and 46, are provided between the air motor 24 and the speed control servo valve 26. The output of the speed control servo valve 26 is a servo pressure to the snubber valve actuator 30 and the brake actuator 34. These servo pressures are delivered to the actuators by means of lines 48 and 50, respectively.

Referring now to FIG. 3, the unique velocity feedback system developed by the inventors to protect and enhance operation of the thrust reverser/spoiler mechanism is shown. The system includes a stow piston 52 and a deploy piston 54 for each set of blocker doors 14. The stow piston 52 is located within a chamber 56 to which is connected tubing 58. Likewise, the deploy piston 54 is positioned within a chamber 60 to which is connected tubing 62. Extending from both the stow piston 52 and the deploy piston 54 are piston rods 64 and 66, respectively.

The stow piston 52 is positioned in such a manner that the blocker door 14 will come into contact with the piston rod 64 as it nears a stop 67 for its final stowed position. Both the stow piston 52 and the deploy piston 54 are spring loaded into a certain position by means of springs 68 located within the chambers 56 and 60. In this manner, the piston 52 picks up the travel of the thrust reverser door 14 as it nears the stop 67 and provides a pressure signal ($P_x$) which is indicative of the velocity of the blocker door 14 during the portion of the travel in which the piston 52 is engaged.

Likewise, the deploy piston 54 is positioned such that the blocker door 14 comes into contact with the piston rod 66 as it nears a stop 69 for its fully deployed position. The movement of the piston 54 provides a pressure signal ($P_y$) in the chamber 60 which is indicative of the velocity of the blocker door 14 during that portion of its travel in which it engages the piston rod 66. The pressures developed within the chambers 56 and 60 are then transferred to the servo valve 26 in a manner to be described.

Referring still to FIG. 3, the tubing 58 and the tubing 62 are connected to a pressure line 70 through one way check valves 72 and 74, respectively. The pressure line 70, in turn, branches into a pair of lines 76 and 78, the first of which includes a relief valve 80, the function of which will be described shortly. The pressure line 78, in turn, branches into a pair of lines 82 and 84. The line 82 provides an input to the servo valve 26, while the line 84 is vented through a resistor 86.

The pressure in the line 70 is maintained at a level well over ambient pressure by means of a connection to an inlet manifold 87 for the air motor 24 through a pressure regulator 88. The output of the pressure regulator 88 is delivered to the line 70 through lines 90 and 92, which include check valves 94 and 96. The output of the pressure regulator 88 further provides an input to the servo valve 26 through a line 98 and to the relief valve 80 through a line 100.

The relief valve 80 limits the differential pressure across a diaphragm 102 located within the servo valve 26. That is, the relief valve 80 is set so that when the pressure within the line 76 reaches a certain level, the relief valve 80 opens and permits flow from the line 76 to be vented through an opening 104. Since the pressure in line 76 is the same as the pressure in line 70, and the pressure in line 70 is a direct function of $P_x$ or $P_y$, the relief valve 80 thus bleeds off $P_x$ $P_y$ values above a certain level. In this manner the pressure differential across the diaphragm 102 is limited in order to protect the servo valve 26 and to provide a controlled output therefrom.

As shown in FIG. 3, the servo valve 26 includes, in addition to the diaphragm 102, flexible diaphragms 106, 108, and 110, which are interconnected by means of a rigid shaft 112. The diaphragms cooperate with a surrounding casing to provide chambers 114, 116, 118, 120, and 122. As shown, the chamber 114 is supplied with the static pressure from the inlet manifold 87 by means of a pressure tap 124, while the chamber 116 is supplied with the total pressure from the manifold 87 by means of a probe 126. As previously mentioned, the chamber 118 is supplied with a regulated pressure by means of the line 98, while the chamber 120 is supplied with a pressure which is a function of $P_x$ or $P_y$ by means of the line 82.

The final chamber of the servo valve 26, chamber 122, is supplied with a suitable servo fluid by means of a line 128 which includes a restrictor 130. The chamber 122 further includes a vent outlet 132 spaced slightly from the flexible diaphragm 110. Finally, the chamber 122 includes an outlet 134 to which are connected the servo pressure lines 48 and 50.

The gap between the diaphragm 110 and the vent outlet 132 determines the amount of servo fluid which will exit the chamber 122 through the vent 132. In this manner the gap also determines the amount of servo fluid which will be delivered to the snubber actuator 30 and the brake actuator 34 by means of the servo pressure lines 48 and 50. Because of the interconnecting shaft 112, the gap between the diaphragm 110 and the vent outlet 132 is a unique function of the pressure within each of the chambers 114, 116, 118, and 120.

The operation of the above described system is as follows: as previously described in connection with FIG. 1, upon reaching a certain landing speed the pilot actuates the thrust reverser mechanism as shown schematically by means of the pilot input 25. The pilot signal operates the pneumatic drive unit 22, which activates the air motor 24 to drive the actuators 12 through the mechanical connection 27 and moves the blocker doors 14 into the thrust reversing position.

As the blocker doors 14 approach the stops 69 for the fully deployed position, the doors 14 come into contact with the piston rod 66. Movement of the rod 66 generates a pressure ($P_y$) within the chamber 60, which is delivered to the chamber 120 of the servo valve 26 through the lines 62, 70, 78, and 82. At the same time, air is being delivered to the air motor 24 from the air supply 18 through the manifold 87. As the velocity of the air motor 24 increases, the velocity of the air within the manifold 87 also increases. As the velocity of the air increases, the pressure within the chamber 116 of the servo valve 26 also increases. Thus, the speed of the air motor 24 and the speed of the blocker door 14 set certain pressure levels within chambers of the servo valve 26 and thus set the gap between the diaphragm 110 and the vent outlet 132. This gap, in turn, determines the amount of servo fluid which is delivered to the snubber valve actuator 30 and the brake actuator 34 by means of the servo pressure lines 48 and 50.

As the pressure within the chambers 120 and 116 increases, the gap between the diaphragm 110 and the vent outlet 132 will decrease, thereby increasing the pressure within the chamber 122. This will increase the amount of servo fluid delivered to the snubber valve actuator 30 and the braek actuator 34, whereby the snubber valve 28 and the brake 32 will decrease the output of the air motor 24 and thus slow the velocity of the blocker doors.

As the velocity of the blocker doors 14 decreases, the pressure $P_y$ will also decrease because the chamber 60 will be vented through the lines 62, 70, 78, and 84. The rate of venting is determined by the value of the resistance 86. As the pressure within the chamber 60 decreases, the pressure within the chamber 120 will also decrease because of the interconnecting lines. Thus, the gap between the diaphragm 110 and the vent outlet 132 will increase thereby cutting the amount of servo fluid delivered to the snubber actuator valve 30 and the brake actuator 34.

As described above, the vent line 84 and the restrictor 86 provide a control system with the very desirable function of modulation. That is, the control system output first increases to a certain level and then automatically decreases, with the net result being that the blocker doors 14 are quickly slowed as they reach their fully deployed position and are driven into their stops at the desired velocity; but as their motion stops the control system releases the brake 37 and the air motor 24 drives the reverser doors 14 against the stops with full torque. This prevents the thrust reverser from vibrating against the stops and from causing damage to the components thereof. Also, this positive closure assures minimum engine nacelle drag during normal aircraft flight. This desirable function is achieved because as the piston 54 moves the pressure within the chamber 120 of the servo valve 26 quickly builds up to that level needed to provide servo fluid directly to the snubber valve actuator 30 and the brake actuator 34. As the motion of the piston 54 stops (when the blocker door 14 reaches the stop 69), the pressure within the chamber 120 quickly bleeds off through resistor 86 and the vent line 84. This causes the gap between the diaphragm 110 and the vent outlet 132 to widen with the result being that the servo fluid being delivered to the snubber valve actuator and the brake actuator decreases. This decrease in servo fluid permits the air motor 24 to again drive the blocker doors 14 against their stops with full torque.

While the above description was given in connection with movement of the blocker doors to the deployed position, the operation of the system is identical when the blocker doors 14 are being stowed. The only change, of course, is that movement of the blocker doors into the stowed position causes the stow piston 52 to be displaced at which time a pressure $P_x$ will build up within the chamber 56 and will be delivered to the chamber 120 of the servo valve 26, as described above.

While a preferred embodiment of applicants' device has been shown and completely described, it should be obvious to those skilled in the art that certain changes could be made in the above embodiment without departing from the broader aspects of applicants' invention. For example, the above described design of the servo valve 26 is merely meant to be illustrative of the many designs of servo valves which could be used. For example, in some cases the speed sensing function provided by the chambers 114 and 116 and the diaphragm 106 could be eliminated entirely while still providing a completely operable system. As a further example, while only single wall tubing is shown in FIG. 3, from a reliability standpoint it would be desirable to provide double walled concentric tubing through the entire system. Also, in a system where contaminants are no problem, the pressure regulator 88 and its associated hardware could be eliminated. It is intended that the appended claims cover these and all similar changes which do not depart from applicants' broader inventive concepts.

What we claim is:

1. In a control system for positioning and retaining a movable load member at one or more extreme positions of movement, said control system including an air motor; a pneumatic drive unit for controlling said air motor, said pneumatic drive unit including means for controlling the speed of said air motor and a servo valve for controlling said speed controlling means; and means for translating the output of said air motor into movement of said load member; the improvement comprising:

means for sensing the velocity of said movable load member as it approaches an extreme position; means for converting said velocity into a pressure signal input to said servo valve, said pressure signal causing said speed controlling means to become operative; and means for bleeding said pressure signal from said servo valve after said load member reaches its extreme position whereby said speed controlling means is disengaged and said load member is held in its extreme position by substantially the full output of said air motor.

2. A control system as recited in claim 1 wherein said velocity sensing means comprise one or more pistons positioned such that movement of said load member near its extreme position causes movement of said piston, each of said pistons having associated therewith a piston chamber wherein a pressure is developed as a result of movement of said piston, said pressure being a function of the velocity of said load member.

3. A control system as recited in claim 2 wherein said piston chamber is connected to said servo valve by means of tubing, said tubing having a branch between said servo valve and said chamber, and said branch includes means for venting said tubing.

4. The control system recited in claim 3 further characterized in that said tubing has connected thereto, between said chamber and said branch, a source of pressurized air and a pressure regulator whereby the pressure within said tubing is maintained above ambient pressure.

5. The control system recited in claim 4 wherein said movable load member comprises a thrust reverser door for an aircraft gas turbine engine.

6. The control system recited in claim 5 further characterized in that said reverser door includes at least one of said pistons near said door's fully deployed and fully stowed positions.

7. The control system recited in claim 6 wherein said speed controlling means includes a brake and a brake actuator, said brake actuator being connected to said servo valve.

8. The control system recited in claim 6 further includes a snubber valve and a snubber valve actuator, said snubber valve actuator being connected to said servo valve.

References Cited
UNITED STATES PATENTS

| | | | |
|---|---|---|---|
| 2,924,933 | 2/1960 | Grube et al. | 60—242 |
| 3,015,935 | 1/1962 | Evans | 60—242 X |
| 3,016,696 | 1/1962 | Bryant | 60—242 |
| 3,227,048 | 1/1966 | Criffield et al. | 60—242 X |
| 3,433,021 | 3/1969 | Kast | 60—242 |
| 3,523,423 | 8/1970 | Young | 60—242 X |

RICHARD A. SCHRACHER, Primary Examiner

R. W. THIEME, Assistant Examiner

U.S. Cl. X.R.

60—242; 91—367, 388